United States Patent [19]

Fowler

[11] Patent Number: 4,843,865
[45] Date of Patent: Jul. 4, 1989

[54] METHOD OF CALIBRATING A COMPASS HEADING

[75] Inventor: John T. Fowler, Marblehead, Mass.

[73] Assignee: Digicourse, Inc., Harahan, La.

[21] Appl. No.: 161,915

[22] Filed: Feb. 29, 1988

[51] Int. Cl.$^4$ ............................................. G01C 17/38
[52] U.S. Cl. ...................................................... 73/1 E
[58] Field of Search ........................... 73/1 E, 33/356

[56] References Cited

U.S. PATENT DOCUMENTS

| | | | |
|---|---|---|---|
| 3,683,668 | 8/1972 | Baker et al. | 73/1 E |
| 3,772,503 | 11/1973 | Fowler . | |
| 3,824,587 | 7/1974 | Fowler . | |
| 3,832,787 | 9/1974 | Fowler | 33/358 |
| 3,833,901 | 9/1974 | Fowler . | |
| 3,888,016 | 6/1975 | Fowler | 33/346 |
| 3,927,474 | 12/1975 | Lapeyre et al. | 33/356 |
| 3,944,813 | 3/1976 | Fowler | 250/205 |
| 3,975,621 | 8/1976 | Fowler . | |
| 4,004,348 | 1/1977 | Fowler et al. | 33/364 |
| 4,024,382 | 5/1977 | Fowler . | |
| 4,027,398 | 6/1977 | Fowler et al. | 33/363 |
| 4,031,630 | 6/1977 | Fowler | 33/356 |
| 4,047,168 | 9/1977 | Fowler . | |
| 4,091,543 | 5/1978 | Lapeyre | 33/356 |
| 4,400,789 | 8/1983 | Carpenter et al. | 73/1 E X |
| 4,425,716 | 1/1984 | Fowler | 33/355 |
| 4,443,795 | 4/1984 | Fowler | 340/870.31 |
| 4,471,534 | 9/1984 | Fowler | 33/363 |
| 4,503,621 | 3/1985 | Fowler | 33/361 |
| 4,671,120 | 6/1987 | Fowler | 73/291 |
| 4,698,912 | 10/1987 | Fowler et al. | 33/356 |

*Primary Examiner*—Tom Noland
*Attorney, Agent, or Firm*—Weingarten, Schurgin, Gagnebin & Hayes

[57] ABSTRACT

A method for compensating for pitch and roll misalignment in 3-axis magnetometer-type compasses wherein the magnetometer during factory calibration is subjected to magnetic fields corresponding to at least two different latitudes, and correction coefficients for the measured x and y (or horizontal) magnetic field components are derived from signals derived from the z axis (or vertical) magnetic field sensor. The correction coefficients are permanently stored in the compass to provide a heading corrected for internal pitch and roll misalignment of the magnetometer field measuring elements relative to the true vertical that would normally cause errors in azimuth with changes in latitude. No further correction or misalignment is necessary in the field for compass use.

4 Claims, 1 Drawing Sheet

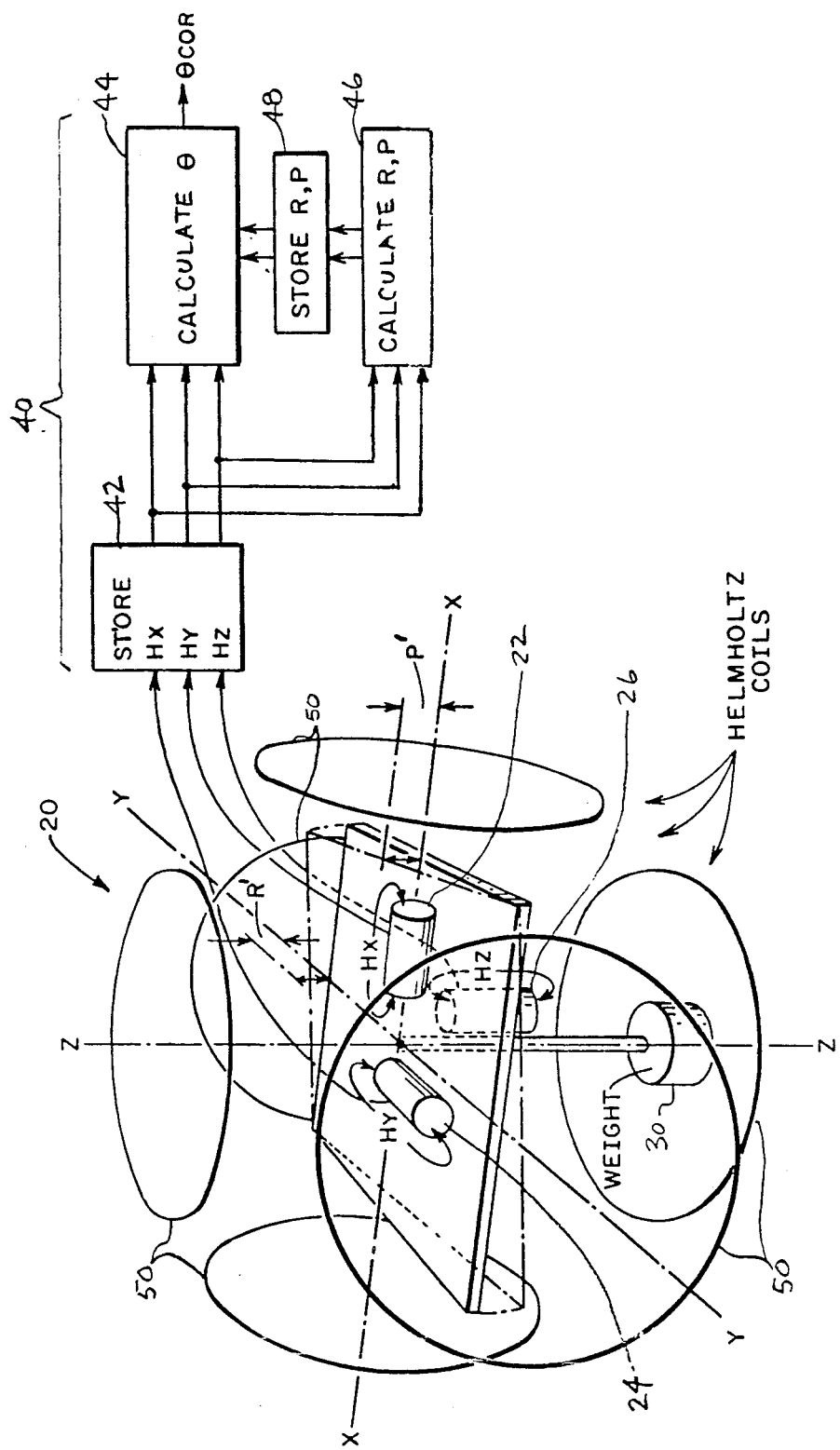

METHOD OF CALIBRATING A COMPASS HEADING

FIELD OF THE INVENTION

The present invention relates to magnetometer-type compasses, in particular, methods and apparatus for correcting magnetometer compass errors arising from non-vertical disposition of the field sensing components therein relative to "down", or true gravitational vertical.

BACKGROUND OF THE INVENTION

In the type of magnetometer-type compasses which incorporate three orthogonally disposed providing output signals corresponding to the two horizontal components, Hx and Hy, and a signal corresponding to the vertical magnetic field component, Hz, the compass heading $\theta$ is calculated according to the equation $$\theta = \text{arc tan } (Hy/Hx) \qquad (1)$$

and the Hz component is reserved for other positioned calculations. Such compasses typically dispose the horizontal field (Hx and Hy) sensors on a common planar structure and movable about both horizontal axes, and include a pendant weight disposed orthogonal to the plane having the Hx and Hy sensors so that the Hz component is directed radially inward towards the earth's center, and that the planar structure is disposed tangentially to the earth's surface. Such compasses are typically electronically and mechanically complex and are contained within a sealed, fluid-filled housing making accurate adjustment of the assembled elements difficult. When the horizontal field measuring components are not perfectly orthogonal to the Hz component measuring element, the heading as calculated by the equation (1) will in certain conditions, such as latitude extremes, include significant errors therein unless accurately recalibrated.

Compass calibrations have typically involved field calculations wherein the platform is moved to a variety of different locations at the earth's surface and the calculated heading corrected according to errors between the known locations and the heading produced by the compass. Such calibration procedures are clearly inconvenient and frequently inaccurate.

SUMMARY OF THE INVENTION

The method of correcting the compass heading according to the present invention comprises the application of at least two different magnetic fields to the compass in the final steps of manufacture. Signals corresponding to the horizontal and vertical field components, Hx and Hy, and Hz, are stored for at least the two different applied magnetic fields, wherein differences between the measured horizontal field components (relative to the vertical components) for the two applied magnetic fields are processed to provide two correction coefficients which are subsequently permanently stored in the compass for inclusion in the calculation of the heading angle. The process is executed entirely within the laboratory or within the manufacturing environment and the calculated error correction coefficients are stored locally on each compass manufactured. The coefficients once calculated and stored on the compass need not be revised in the field after installation and reflect residual imbalances in pitch and roll.

Furthermore, should the compass be subjected to physical shock causing the alignment of the horizontal field measuring components to change relative to the vertical field measuring component, the compass may be returned for factory recalibration without disassembling the housing or the mechanical structure.

BRIEF DESCRIPTION OF THE DRAWING

These and further features of the present invention will be better understood by reading the following detailed description, taken together with the drawing which shows a pictorial arrangement of the compass according to the present invention including a block diagram of the heading calculation and calibration elements.

DETAILED DESCRIPTION OF THE INVENTION

In a compass including a magnetometer assembly 20, as illustrated in the FIGURE, which includes three orthogonal magnetic field sensing flux gates 22, 24 and 26, disposed along the x, y and z coordinates, respectively, and attached to a planar mounting surface 28 from which a pendant weight 30 is suspended, typically along the z coordinate. The planar surface 28 is gimballed to be freely moveable about the x and y coordinates. The weight 30 maintains the z axis radially directed toward the center of the earth, and the planar surface 28, generally tangential to the surface of the earth. The Hy, Hx and Hz signals as measured by the flux gates 22, 24 and 26 are received and stored by a signal sampling element 42 as part of the computational portion 40 of the compass, so that the heading angle $\theta$ is calculated in the element 44. In the system as described, the heading angle $\theta$, if calculated according to equation (1), would be uncorrected for errors in alignment between the gravitational vertical and the horizontal sensing elements 22 and 24 on the planar surface 28. According to the present invention, the misalignment of the vertical sensing element 46 produces errors R and P as illustrated in the figure, which are reflected in the calculation of the heading angle $\theta$, as illustrated by equations 2 and 3:

$$Hx = H_{x'} \cos \theta + H_{z'} \sin P \qquad (2)$$

where $H_{z'}$ is the actual vertical component of the earth's field and $H_{x'}$ is the actual x horizontal component of the earth's field, and $$Hy = H_{y'} \cos \theta + H_{z'} \sin R \qquad (3)$$

where $H_{y'}$ is the actual y horizontal field of the earth's field. If R and P are small angles, i.e., less than 15°, then:

$$Hx = H_{x'} \cos \theta + H_{z'} * P \qquad (4)$$

and $$Hy = H_{y'} \cos \theta + H_{z'} * R \qquad (5)$$

Correction coefficients R and P are determined and correspond to the misalignment of the planar surface 28 as reflected in the spacings illustrated by R and P in the FIGURE. The correction coefficients R and P are calculated by sequentially providing substantially uniform first and second magnetic fields through the area of the field sensing elements 22, 24 and 26, typically provided by Helmholz coils 50 as part of the laboratory or manufacturing assembly process. THe Helmholz coils 50 are energized to provide the first and second magnetic fields to correspond to two different latitudes, wherein two different Hz' fields are provided. The signal from the horizontal component Hz is measured for the two different magnetic fields, according to equations 6 and 7, below, wherein the difference is provided by equation (8):

$$Hx'_1 = Hx' \cos \theta + Hz'_1 * P \qquad (6)$$

$$Hx'_2 = Hx' \cos \theta + Hz'_2 * P \qquad (7)$$

$$Hx'_1 - Hx'_2 = (Hz'_1 - Hz'_2) * P \qquad (8)$$

The difference in the Hy signal is similarly measured and the difference calculated by equation (9):

$$Hy'_1 - Hy'_2 = (Hz'_1 - Hz'_2) * R \qquad (9)$$

The P and R correction coefficients are calculated as follows, reflecting the imbalance or misalignment of the magnetic field sensing elements in the compass:

$$(Hx'_1 - Hx'_2)/(Hz'_1 - Hz'_2) = dHx/dHz = P \qquad (10)$$

$$(Hy'_1 - Hy'_2)/(Hz'_1 - Hz'_2) = dHy/dHz = R \qquad (11)$$

The resulting coefficients P and R are stored in the compass, wherein the two horizontal components, as illustrated by equations (12) and (13) are calculated and include the correction coefficients P and R..

$$Hxm \ (Hx \text{ measured}) = H_H \cos \theta = Hx''' Hz' * P_P \qquad (12)$$

$$Hym = H_H \sin \theta = Hy' - Hz' * R_R \qquad (13)$$

Therefore, the correction heading of $\theta_{COR}$ is calculated according to equation (14):

$$\theta_{COR} = ATN(Hym/Hxm) = (Hy - Hz * R_R)/(Hx - Hz * P_P) \qquad (14)$$

or more exactly:

$$\theta_{COR}* = ATN(Hym/Hxm) = (Hx' \sin \theta - Hz * R)/(Hx' \cos \theta - Hz * P) \qquad (15)$$

Also, H vector output signals can be provided according to equations (16) and (17):

$$Hx(COR) = Hx' \cos \theta + Hz' \sin P \qquad (16)$$

$$Hy(COR) = Hx' \sin \theta + Hz' \sin R \qquad (17)$$

As illustrated in the FIGURE, the stored values of Hx, Hy and Hx are received by the element 46 which calculates the R and P correction coefficients according to the equations described above. The resulting correction coefficients R and P are stored in a storage register 48 which comprises an EPROM, a ROM or equivalent device. The correction coefficient calculation element may be part of the calculation element 44 and resident with the magnetometer element 20. In alternate embodiment, the calculation of the correction coefficients R and P by element 46 is provided by a device external to the compass and connected only when the compass is calibrated during manufacture.

As an example of the calibration procedure according to the present invention, the Helmholz coils are energized to provide two separate Hz corresponding magnetic fields of −500 mg (milligauss), +500 mg. Thus, for the calculation of P in equation (10), $Hx_1$ may equal 100, $Hx_2$ may equal 110, and $Hz_1 - Hz_2 = 1000$. Thus, P=dHx/dHz=0.01 which corresponds to an imbalance or misalignment of 0.57°.

Modifications and substitutions made by one of ordinary skill in the art are within the scope of the present invention, which is not to be limited except by the claims which follow:

What is claimed is:

1. A method of calibrating compass heading $\theta$ for a compass comprising a magnetometer having means for sensing horizontal components as independent output signals Hx and Hy and means for sensing the vertical component providing a corresponding Hz output signal, the method comprising the steps of:

applying a first magnetic field representative of the earth's magnetic field at a first latitude;

storing the Hx, Hy and Hz signals corresponding to said first magnetic field;

applying a second magnetic field representative of the earth's magnetic field at a second latitude;

storing the Hx, Hy and Hz signals corresponding to said second magnetic field;

providing the difference between the different stored instances of Hx, Hy and Hz as dHx, dHy and dHz signals, respectively;

calculating a first error coefficient signal P according to dHx/dHz;

calculating a second error coefficient signal R according to dHy/dHz; and adding the error coefficients P and R to the calculation of the cosine and sine of the heading angle, wherein the corrected heading angle is computed as:

$$\theta = \arctan (Hym/Hxm) =$$

$$(Hx' \sin \theta - Hz' * R)/(Hx' \cos \theta - Hz' * P)$$

wherein

Hxm is Hx measured,

Hym is Hy measured,

Hx' is the actual x horizontal component of the earth's field, and

Hz' is the actual vertical component of the earth's field.

2. The method of claim 1, wherein the R and P terms comprise sin R and cos P, respectively, to provide the exact form of computed heading angle:

$$\theta = \arctan (Hym/Hxm) =$$

$$(Hy - Hz \sin R)/(Hx - Hz \cos P).$$

3. The method of claim 1, wherein the calculation is provided externally to the compass.

4. A method of calibrating compass heading $\theta$ for a compass comprising a magnetometer having means for sensing horizontal components as independent output signals Hx and Hy and means for sensing the vertical component providing a corresponding Hz output signal, the method comprising the steps of:

applying a first magnetic field representative of the earth's magnetic field at a first latitude;

storing the Hx, Hy and Hz signals corresponding to said first magnetic field;

applying a second magnetic field representative of the earth's magnetic field at a second latitude;

storing the Hx, Hy and Hz signals corresponding to said second magnetic field;

providing the difference between the difference stored instances of Hx, Hy and Hz as dHx, dHy and dHz signals, respectively;

calculating a first error coefficient signal P according to dHx/dHz;

calculating a second error coefficient signal R according to dHy/dHz; and adding the error coefficients P and R to the calculation of the cosine and sine of the heading angle producing the following H vector output signals:

$$Hx(\text{corrected}) = Hx' \cos \theta + Hz' \sin P$$

$$Hy(\text{corrected}) = Hy' \cos \theta + Hz' \sin R,$$

wherein
- $Hx'$ is the actual x horizontal component of the earth's field,
- $Hy'$ is the actual y horizontal component of the earth's field, and
- $Hz'$ is the actual z vertical component of the earth's field.

* * * * *

UNITED STATES PATENT AND TRADEMARK OFFICE
CERTIFICATE OF CORRECTION

PATENT NO. : 4,843,865
DATED : July 4, 1989
INVENTOR(S) : John T. Fowler It is certified that error appears in the above-identified patent and that said Letters Patent is hereby corrected as shown below:

In Column 3, line 2, "THe" should read --The--.

In Column 3, line 32, "Hxm (Hx measured)=$H_H$cos ⊖ =Hx"Hz'*Pp" should read --Hxm (Hx measured)=$H_H$cos ⊖ =Hx'-Hz'*Pp --.

In Column 5, line 3, "difference between the difference" should read --difference between the different--.

Signed and Sealed this

Ninth Day of June, 1992

*Attest:*

DOUGLAS B. COMER

*Attesting Officer*     *Acting Commissioner of Patents and Trademarks*